(12) United States Patent
Brabson et al.

(10) Patent No.: US 6,832,260 B2
(45) Date of Patent: Dec. 14, 2004

(54) METHODS, SYSTEMS AND COMPUTER PROGRAM PRODUCTS FOR KERNEL BASED TRANSACTION PROCESSING

(75) Inventors: Roy Frank Brabson, Raleigh, NC (US); Lap Thiet Huynh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 649 days.

(21) Appl. No.: 09/915,876

(22) Filed: Jul. 26, 2001

(65) Prior Publication Data

US 2003/0023767 A1 Jan. 30, 2003

(51) Int. Cl.[7] .............................................. G06F 15/16
(52) U.S. Cl. ...................... 709/230; 709/238; 718/101
(58) Field of Search .............................. 719/310–320; 718/100–106; 709/200–203, 230–245

(56) References Cited

U.S. PATENT DOCUMENTS

| | | | | |
|---|---|---|---|---|
| 4,403,286 | A | 9/1983 | Fry et al. ..................... | 364/200 |
| 4,495,570 | A | 1/1985 | Kitajima et al. ............ | 364/200 |
| 4,577,272 | A | 3/1986 | Ballew et al. .............. | 364/200 |
| 5,031,089 | A | 7/1991 | Liu et al. ..................... | 364/200 |
| 5,515,508 | A * | 5/1996 | Pettus et al. ................ | 709/203 |
| 5,548,723 | A * | 8/1996 | Pettus ......................... | 709/228 |
| 5,563,878 | A | 10/1996 | Blakeley et al. ............. | 370/60 |
| 5,675,739 | A | 10/1997 | Eilert et al. .................. | 395/200 |
| 5,917,997 | A | 6/1999 | Bell et al. .............. | 395/182.02 |
| 5,923,854 | A | 7/1999 | Bell et al. .............. | 395/200.73 |
| 5,935,215 | A | 8/1999 | Bell et al. .................... | 709/239 |
| 5,951,650 | A | 9/1999 | Bell et al. .................... | 709/238 |
| 6,389,479 | B1 * | 5/2002 | Boucher et al. ............ | 709/243 |
| 6,658,480 | B2 * | 12/2003 | Boucher et al. ............ | 709/239 |

OTHER PUBLICATIONS

A. Dahlin, et al. *EDDIE A Robust and Scalable Internet Server*. Ericsson Telecom AB, Stockholm, Sweden, pp. 1–7 (May 1998).

Brochure entitled *ACEdirector™ 8–Port 10/100 MBPS Ethernet Switch*. Alteon WebSystems, San Jose, CA (1999).

Brochure entitled *Enhancing Web User Experience with Global Server Load Balancing*. Alteon WebSystems, San Jose, CA (Jun. 1999).

Brochure entitled, *The Next Step in Server Load Balancing*. Alteon WebSystems, San Jose, CA (Nov. 1999).

(List continued on next page.)

*Primary Examiner*—St. John Courtenay, III
(74) *Attorney, Agent, or Firm*—Myers Bigel Sibley & Sajovec, P.A.; Jerry W. Herndon, Esq.

(57) ABSTRACT

Methods, systems and computer program products are provided for transferring a Transmission Control Protocol (TCP) connection with a client device between data processing systems in a cluster of data processing systems. An operating system kernel of a first data processing system obtains application level information from a transaction received from the client over the connection. In addition, application state information associated with the connection may be obtained from the first application. A second application at a second data processing system is selected for transfer of the connection based on the obtained information and the connection is transferred to the second data processing system. The transfer includes providing to the second data processing system the associated state information of the first communication protocol stack and, optionally, the obtained application state information associated with the connection from the first application. Selection operations for transfers may be initiated responsive to a notification from the first application of completion of a transaction.

54 Claims, 5 Drawing Sheets

OTHER PUBLICATIONS

Mac Devine. Presentation entitled *TCP/IP Application Availability and Workload Balancing in the Parallel Sysplex*. Share Technical Conference (Aug. 22–27, 1999).

http://w3.enterlib.ibm.com:80/cgi–bin/bookmgr/books/F1Af7001/1.3.1.2; *1.3.1.2.5 Virtual IP Addressing (VIPA)*; Excerpt from IP Configuration for OS/390, pp. 1–4 (1998).

http://w3.enterlib.ibm.com:80/cgi–bin/bookmgr/books/F1AF7001/1.3.2; *1.3.20 Device and Link Statement—Virtual Devices (VIPA)*; Excerpt from IP Configuration for OS/390, pp. 1–3 (1998).

http://w3.enterlib.ibm.com:80/cgi–bin/bookmgr/books/F1AF7001/1.3.2; *1.3.23. HOME Statement*; Excerpt from IP Configuration for OS/390, pp. 1–6 (1998).

Pai et al. *Locality–Aware Request Distribution in Cluster–based Network Servers*. Proceedings of the 8th International Conference on Architectural Support for Programming Languages and Operating Systems (ASPLOS VIII), San Jose, CA, Oct., 1998.

Aron et al. "Scalable Content–aware Request Distribution in Cluster–based Network Servers." Proc. of the 2000 Annual Usenix Technical Conference, San Diego, CA, Jun. 2000.

Aron et al. "Efficient Support for P–HTTP in Cluster–Based Web Servers." Proc. of 1999 Annual Usenix Technical Conference, Monterey, CA, Jun. 1999.

Aron, Mohit. "Scalable Content–aware Request Distribution in Cluster–based Network Servers." http://softlib.rice.edu/softlib/scalableRD.html. Department of Computer Science, Rice University.

"Data Communications Awards Allot Communications 'Hot Product' in Internetworking/IP Tools Category." Press Bulletin. Los Gatos, CA, Jan. 18, 1999.

"Allot Introduces Turnkey Next Generation IP Service and Creation Solution—the Virtual Bandwidth Manager." Press Bulletin. Atlanta, GA, SUPERCOMM 2000, Booth #8458, Jun. 5, 2000.

"Allot Announces the General Availability of its Directory Services–Based NetPolicy™ Manager." Press Bulletin. Tel Aviv, Israel, Feb. 28, 2000.

"Allot Communications Announces the Netenforcer Family of IP Traffic Management Products: Fault–Tolerant, Scaleable, Policy–Based Bandwidth Management, QOS, SLA Solutions." Press Bulletin. Burlingame, CA, Dec. 13, 1999.

"Allot Communications Announces Business–Aware Network Policy Manager." Press Bulletin. Sophia Antipolis, France, Sep. 20, 1999.

"Allot Communications Announces Directory Services Based Network Policy Manager." Press Bulletin. Los Gatos, CA, Apr. 5, 1999.

"Allot Communications Launches NetEnforcer with NetWizard, the Fastest Way to Implement Accurate and Reliable Network QoS Policies." Press Bulletin. Burlingame, CA, Jan. 25, 2001.

"Policy–Based Network Architecture." from www.allot.com pp. 1–11.

Internet draft entiteld "Policy Core LDAP Schema," draft–IETF–policy–core–schema–07.txt, Jul. 14, 2000 ("IETF proposal").

*Hash Tables, Introduction to Algorithms*, by T.H. Cormen, C.E. Leiserson and R.L. Rivest; Chapter 12, MIT Press, 1990.

*URL Forwarding and Compression in Adaptive Web Caching, Proceeding IEEE INFOCOM 2000*; by B.S. Michel, et al., vol. 2, p. 670–678.

Mac Devine. Presentation entitled, *TCP/IP Application Availability and Workload Balancing in the Parallel Sysplex*. Share Technical Conference (Aug. 22–27, 1999).

\* cited by examiner

METHODS, SYSTEMS AND COMPUTER PROGRAM PRODUCTS FOR KERNEL BASED TRANSACTION PROCESSING

FIELD OF THE INVENTION

The present invention relates to network communications and more particularly to network communications to a cluster of data processing systems.

BACKGROUND OF THE INVENTION

As the use of the Internet has increased, in general, so has the demand placed on servers on the Internet. One technique which has been used to address this increase in demand has been through the use of multiple servers which perform substantially the same function. Applications, such as Telnet or Internet Mail Access Protocol (IMAP)/Post Office Protocol 3 (POP3) mail serving, may need to connect a Transmission Control Protocol (TCP) client to a particular TCP server of a set of similar, but not identical, servers. However, the particular server instance typically cannot be selected until after information from the client has been received. For example, an Internet Service Provider (ISP) may have multiple e-mail servers to which users may connect to obtain their mail. However, when multiple servers which perform substantially the same function are present, selecting which server a user should be connected to may present difficulties.

In the e-mail example discussed above, one conventional approach has been to have users individually configure each client application to request a connection to a dedicated server. Such may be accomplished by providing each server with a unique name or Internet Protocol address and configuring the client to specify the name or address when making a connection. Such approaches may, however, present difficulties in maintaining balanced workload between the servers as users come and go. Furthermore, reconfiguring a large population of client applications may present administrative difficulties.

Another approach to routing clients to specific servers has been through an application unique protocol between the client and the server which performs application redirection. In application redirection, a client typically establishes a first connection to a first server which sends a redirect instruction to the client. Upon receiving the redirection instruction, the client disconnects from the initial server and establishes a second connection to the specified server. One difficulty with such an approach, however, is that the client and the server typically must implement the application-unique protocol to provide the redirection and, thus, the redirection is not transparent to the client.

Another approach is known as proxying, where the client establishes an initial connection to a proxy application and the proxy application forms a second connection with the proper server after obtaining enough information from the client to select a server. Such an approach may have the advantage that the selection and communication with the selected server by the proxy may be transparent to the client. However, both inbound and outbound communications must, typically, traverse a protocol stack twice to be routed by the proxy application. First, the communications traverse the protocol stack to the proxy application and again traverse the protocol stack when routed by the proxy application. Such traversals of the protocol stack may consume significant processing resources at the server executing the proxy application.

In addition, if the data between the client and the server is encrypted, it may not be possible for the proxy to decrypt the data and select the proper server. For example, for Secure Socket Layer/Transport Layer Security (SSL/TLS), the proxy typically must share the SSL/TLS keys with each server for which it proxies. For Internet Protocol Security (IPSec), the proxy typically either acts as the IPSec endpoint for both the client and server or must share the Security Association with the server. In all such cases, in order for the proxy to examine the protocol content, end-to-end security must generally be broken.

In additional approaches, the client establishes a connection to a proxy, which in turn establishes a connection to the ultimate server. Either at a low level in the stack or by instructing an external router, a TCP connection translation function is set up which causes the router or stack to perform modifications on all incoming and outgoing TCP segments. The modifications may include the server-side address (destination for incoming requests, source address for outgoing replies) in the IP header, sequence numbers in the TCP header, window sizes, and the like. Such an approach may not require traversal of the entire TCP stack, but may result in every TCP segment requiring modification, and if IP addresses flow in the application data, the connection translation function may not translate such addresses unless specifically programmed to scan all the application data. This approach also generally requires all flows for the connection, both inbound and outbound, to traverse a single intermediate node, making it a single point of failure (like the proxy).

Furthermore, the Locality-Aware Request Distribution system developed at Rice University is described as providing content-based request distribution which may provide the ability to employ back-end nodes that are specialized for certain types of requests. A "TCP handoff protocol" is described in which incoming requests are "handed off to a back-end in a manner transparent to a client, after the front-end has inspected the content of the request." See Pai et al., "Locality-Aware Request Distribution in Cluster-based Network Servers", Proceedings of the $8^{th}$ International Conference on Architectural Support for Programming Languages and Operating Systems, San Jose, Calif., October, 1998. See also, Aron et al., "Efficient Support for P-HTTP in Cluster-Based Web Servers", Proceedings of the USENIX 1999 Annual Technical Conference, Monterey, Calif., June, 1999. However, this approach is generally directed to a stateless environment with well defined requests, each of which may be distributed to different nodes.

However, often a communication connection such as an Internet connection may be used for transaction processing where the transaction may involve more than one request/response pair. As described for the Locality-Aware Request Distribution system above, all of the transaction requests would be individually routed on a request by request basis even where they were all routed to the same server. In addition, a server may have a state which needs to be transferred along with a connection to support transparent (to the user) handoff which state based transfers are not provided for by the described Locality-Aware Request Distribution system described above.

Other approaches to moving a client connection or session from one server to another include Virtual Telecommunications Access Method (VTAM) multi-node persistent session support (MNPS). VTAM multi-node persistent session support allows for recovering a System Network Architecture (SNA) session state on another VTAM when an application fails and is restarted. However, typically, a client must re-authenticate to the applications or other system using multi-node persistent sessions. Furthermore, such a movement from a first VTAM to a second VTAM typically only occurs after a failure.

VTAM also supports CLSDEST PASS, which causes one SNA session with the client to be terminated and another initiated without disrupting the application using the sessions. Such a movement from one session to another, however, typically requires client involvement.

SUMMARY OF THE INVENTION

Embodiments of the present invention include methods, systems and computer program products for transferring a Transmission Control Protocol (TCP) connection with a client device between data processing systems in a cluster of data processing systems. A connection is established between the client device and a routing node coupled to the cluster of data processing systems utilizing a communication protocol stack at the routing node, the protocol stack having an associated state. An operating system kernel of the routing node obtains application level information from an initial transaction received from the client over the connection. The transaction includes at least one request. The operating system kernel also selects a target application at a first data processing system of the cluster of data processing systems for transfer of the connection based on the obtained information and transfers the connection to a target communication protocol stack on the first data processing system associated with the selected target application including providing the associated state information of the communication protocol stack of the routing node.

The target communication protocol stack accepts the connection from the routing node based on the provided associated state information of the communication protocol stack of the routing node so as to, transparently to the client, establish communications between the client and the target application. A notification of completion of the transaction is received from the target application and the connection is made available to a routing device for selection of a next target application to receive the connection responsive to receipt of the notification of completion of the transaction. The routing device may be the routing node or the first data processing system.

In other embodiments of the present invention, receiving a notification of completion of the transaction from the target application includes receiving the notification from the target application at the target communication protocol stack over the connection as data which is detectable by the target communication protocol stack as being directed to the target communication protocol stack rather than the client. The data may be received as ancillary data of a sendmsg socket call. The data also may include application state information associated with the connection from the target application. In such embodiments, the application state information may be provided to the routing device for use in transferring the connection to the next target application. A communication protocol stack associated with the next target application may receive the application state information and the notification as ancillary data of a recvmsg socket call. The associated state information of the target communication protocol stack may be provided to the routing device for use in transferring the connection to the next target application. In various embodiments, the application state information may be a null set.

In further embodiments of the present invention, an operating system kernel of the routing device obtains application level information from a next transaction received from the client over the connection, the next transaction including at least one request. A next target application at a data processing system of the cluster of data processing systems is selected for transfer of the connection based on the obtained application level information from a next transaction. The connection is transferred to the communication protocol stack associated with the next target application including the associated state information of the target communication protocol stack and the application state information associated with the connection to the communication protocol stack associated with the next target application. The selection of a target application may be carried out by a policy-based engine of the operating system kernel of the routing node.

Sufficient application level information may be obtained to identify the initial transaction. The application level information is obtained in various embodiments by executing application-specific exits within the operating kernel of the routing node to examine data associated with the transaction to identify the transaction to the operating kernel of the routing node. The communication protocol stack of the routing node may be made available after the connection is transferred. In further embodiments of the present invention, the connection is an encrypted connection and the provided associated state information includes encryption information.

In other embodiments of the present invention, methods, systems and computer program products are provided for transferring a Transmission Control Protocol (TCP) connection with a client device between data processing systems in a cluster of data processing systems. A connection is established between the client device and a first application at a first data processing system of the cluster of data processing systems utilizing a first communication protocol stack associated with the first application, the first communication protocol stack having an associated state. An operating system kernel of the first data processing system obtains application level information from a transaction received from the client over the connection, the transaction including at least one request. In addition, application state information associated with the connection is obtained from the first application.

A second application at a second data processing system of the cluster of data processing systems is selected for transfer of the connection based on the obtained information and the connection is transferred to a second communication protocol stack on the second data processing system associated with the selected second application. The transfer includes providing to the second data processing system the associated state information of the first communication protocol stack and the obtained application state information associated with the connection from the first application.

While the invention has been described above primarily with respect to the method aspects of the invention, both systems and/or computer program products are also provided.

DETAILED DESCRIPTION OF PREFERRED EMBODIMENTS

Figure 1:
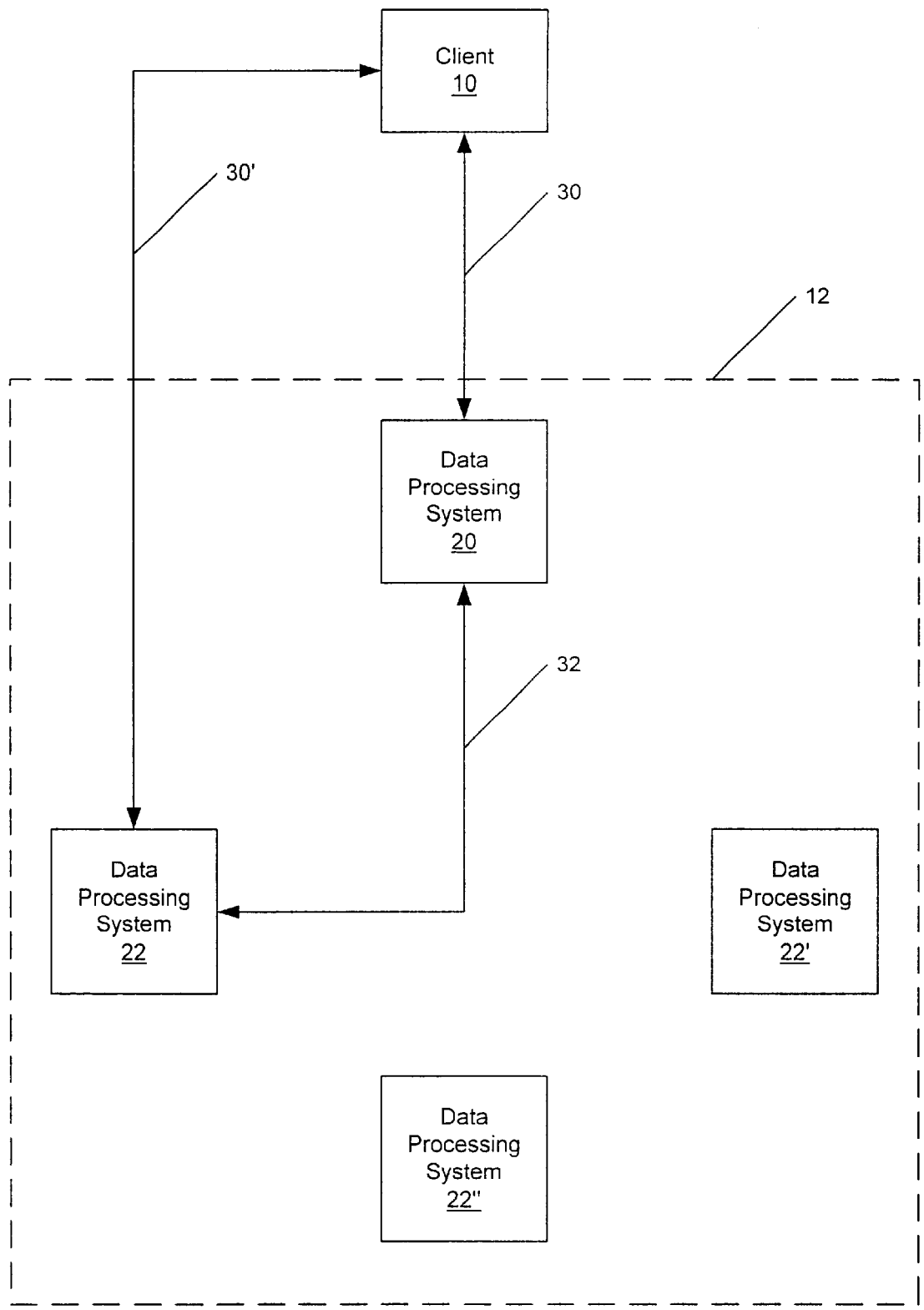
FIG. 1 is block diagram of a system suitable for kernel based transfer of active TCP connections usig application level information according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Embodiments of the present invention provide for content-based transfers of an active TCP connection from one data processing system to another. Such a transfer of an active connection may be beneficial as it may allow for selection of a particular data processing system for handling a client's requested interaction without the client knowing that the transfer has taken place. Such a transfer may include transferring both application state information and connection state information. By transferring the existing active connection and application state, rather than establishing a new connection, the client need not repeat providing the initial information to the data processing system to which the connection is transferred. Furthermore, by transferring the connection to a new data processing system, rather than merely routing packets to and from the new data processing system over a separate connection, administrative overhead may be reduced and scalability may be improved.

A system suitable for use in embodiments of the present invention is illustrated in FIG. 1. As seen in FIG. 1, a client 10 communicates with one or more of a plurality of data processing systems 12. The plurality of data processing systems 12 may include a first data processing system 20, which functions as a routing data processing system, and several additional data processing systems 22, 22' and 22". The additional data processing systems 22, 22' and 22" function as server data processing systems as they are executing instances of an application from which the client 10 is requesting interaction. To request interaction with the server data processing systems, the client 10 establishes an initial TCP connection 30 with the first data processing system 20 of the plurality of data processing systems 12.

The first data processing system 20 communicates with the client 10 over the initial connection 30, for example, through request/response exchanges with the client, until such time as sufficient information is received that the first data processing system 20 can determine which of the additional data processing systems 22, 22' and 22" is to receive the connection with the client 10. When such a determination is made, the first data processing system 20 provides connection and/or application state information to the selected data processing system.

In the example illustrated in FIG. 1, the first data processing system 20 has selected the data processing system 22 and provides the connection and/or application state information to the selected data processing system 22 over the communication path 32. The communication path 32 may be any type of communication path suitable for transferring information between the first data processing system 20 and the selected data processing system 22 and may include, for example, a TCP connection, a UDP connection or a connection through a cross-coupling facility of a SYSPLEX (and XCF connection). If accepted by the selected data processing system 22, the selected data processing system 22 continues to communicate with the client 10 over the transferred connection 30', which is the initial connection 30 transferred to the selected data processing system 22.

Figure 2:
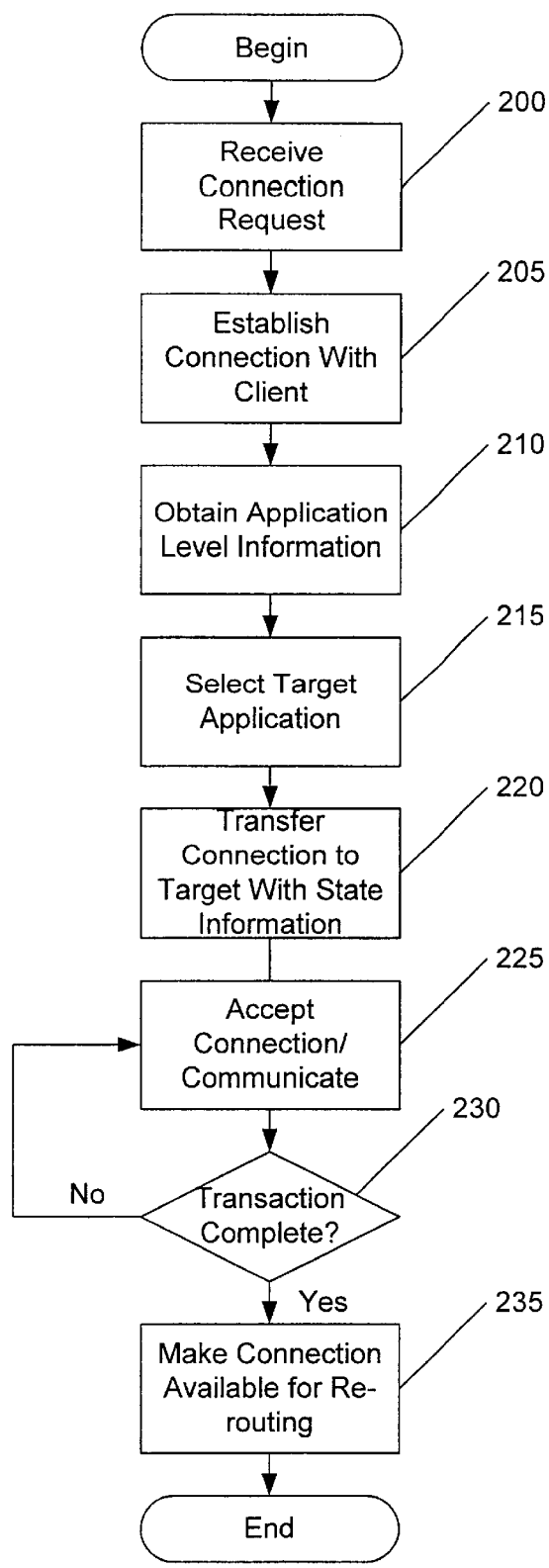
FIG. 2 is a flowchart illustrating operations for kernel based transfer of active TCP connections using application level information according to embodiments of the present invention.

Operations for transferring an active connection are illustrated generally in FIG. 2. As seen in FIG. 2, the first data processing system 20 receives a connection request from the client 10 (block 200). In response to the request, the first data processing system 20 establishes the connection 30 to the client 10 which may be a TCP connection (block 205). The first data processing system 20 communicates with the client 10 over the connection 30 to obtain application level information (such as level 5 or above for TCP/IP connections) from the client 10 through one or more requests communicated from the client 10 as part of a transaction which may include multiple requests (block 210). Sufficient information is obtained to allow the first data processing system 20 to select one of the other data processing systems 22, 22' and 22". For example, in certain embodiments of the present invention, the information may be a user name and/or password from which a mail server is selected.

More particularly, in accordance with various embodiments of the present invention, the obtained information is obtained by an operating system kernel of the first data processing system 20 which may be a routing node and/or may be a data processing system supporting applications for which connections are intended. Alternative approaches to making a decision on routing the connection are described in co-pending and commonly assigned U.S. patent application Ser. No. 09/825,122 titled "Methods, Systems and Computer Program Products for Content-Based Routing Via Active TCP Connection Transfer" filed Apr. 3, 2001 ("the '122 application) which is incorporated herein by reference as if set forth in its entirety.

In any event, once the information is received from the client 10, the operating system kernel of the first data processing system 20 selects a target application at one of the other servers 22, 22' and 22" for transfer of the initial connection 30 based on the obtained information (block 215). The connection 30 is then transferred to a target communication protocol stack on the selected data processing system associated with the selected target application. Connection state information, such as the associated state information of the communication protocol stack of the first data processing system 20 which supports the connection 30 and, optionally, application state information is collected by the first data processing system 20 and provided to the selected data processing system as part of the transfer of the connection (block 220).

An approach to implementing kernel based policy rules suitable for modification in light of the teachings of the present invention to support selection of a target application is described in co-pending and commonly assigned U.S. patent application Ser. No. 09/693,268 titled "Methods, Systems and Computer Program Products for Server Based Type of Service Classification of a Communication Request" filed Oct. 20, 2000 ("the '268 application) which is incorporated herein by reference as if set forth in its entirety. The '268 application describes the use of an application plug-in process in a TCP/IP kernel of an operating system kernel to implement service classification for requests from a client based on application level information obtained in the kernel from the request(s).

As noted above, various embodiments of the present invention obtain application state information and connection state information and provide such information to a receiving target application as part of the transfer of a connection. The particular application state information may vary from application to application. The connection state information should be sufficient to allow the initial connection 30 to be transferred to the selected data processing system 22 to provide the transferred connection 30' without disruption of the initial connection 30. For example, for a TCP connection, the connection and/or application state information may include the source and destination IP addresses and port numbers, the received and sent packet sequence numbers, the client and routing application advertised windows, the negotiated maximum segment size and/ or scaling parameters, if any etc.

The state of the initial connection 30 may also be "frozen" until the initial connection 30 is transferred such that any subsequent packets received by the first data processing system 20 may be discarded by the first data processing system 20 so as to invoke retransmission by the client 10. Alternatively, such packets could be buffered and forwarded to the selected data processing system 22 for acknowledgment by the selected data processing system 22 over the transferred connection 30'.

After the application state and/or connection state information is provided to the selected data processing system 22, the selected data processing system 22 accepts the initial connection 30 to provide the transferred connection 30' based on the provided associated state information (block 225). The selected data processing system 22 may communicate directly with the client 10 over the transferred connection 30' which corresponds to the initial connection 30 taken over by the selected data processing system.

In various embodiments of the present invention, for example, those where only connection state information and not application state information are provided with the transfer of the connection, the operations illustrated at blocks 230 and 235 are also provided. A notification of completion of the transaction is received from the second (target) application by the target communication protocol stack at the selected data processing system 22 (block 230). The target communication protocol stack makes the connection 30' available to a routing device for selection of a next target application to receive the connection 30' responsive to receipt of the notification of completion of the transaction (block 235). The routing device may be the selected data processing system 22 or a routing node, such as the data processing system 20.

Accordingly, with various embodiments of the present invention, selection operations for re-routing of a connection may be implemented on a transaction basis, rather than applied to each request, by using the target application to identify when a transaction has completed. It is to be understood that operations as described above to transfer the initial connection 30 to provide the transferred connection 30' may repeat with the connection 30' viewed as the initial connection for subsequent transfers based on different transactions.

As will be appreciated by those of skill in the art in light of the above discussion, from the perspective of the client 10, the initial connection 30 and the transferred connection 30' (as well as later iterations of transfers) are the same connection. Thus, content-based routing may be achieved and the active connection transferred to a selected data processing system in a manner which is transparent to the client 10.

In particular embodiments of the present invention systems, methods, and/or computer program products are provided which allow for a single IP address being associated with a plurality of communication protocol stacks in a cluster of data processing systems. Thus, embodiments of the present invention may be utilized in a Virtual IP Address (VIPA) environment, cluster address systems using Network Dispatcher, the Sysplex Distributor from International Business Machines Corporation and other load balancer systems.

Figure 3:
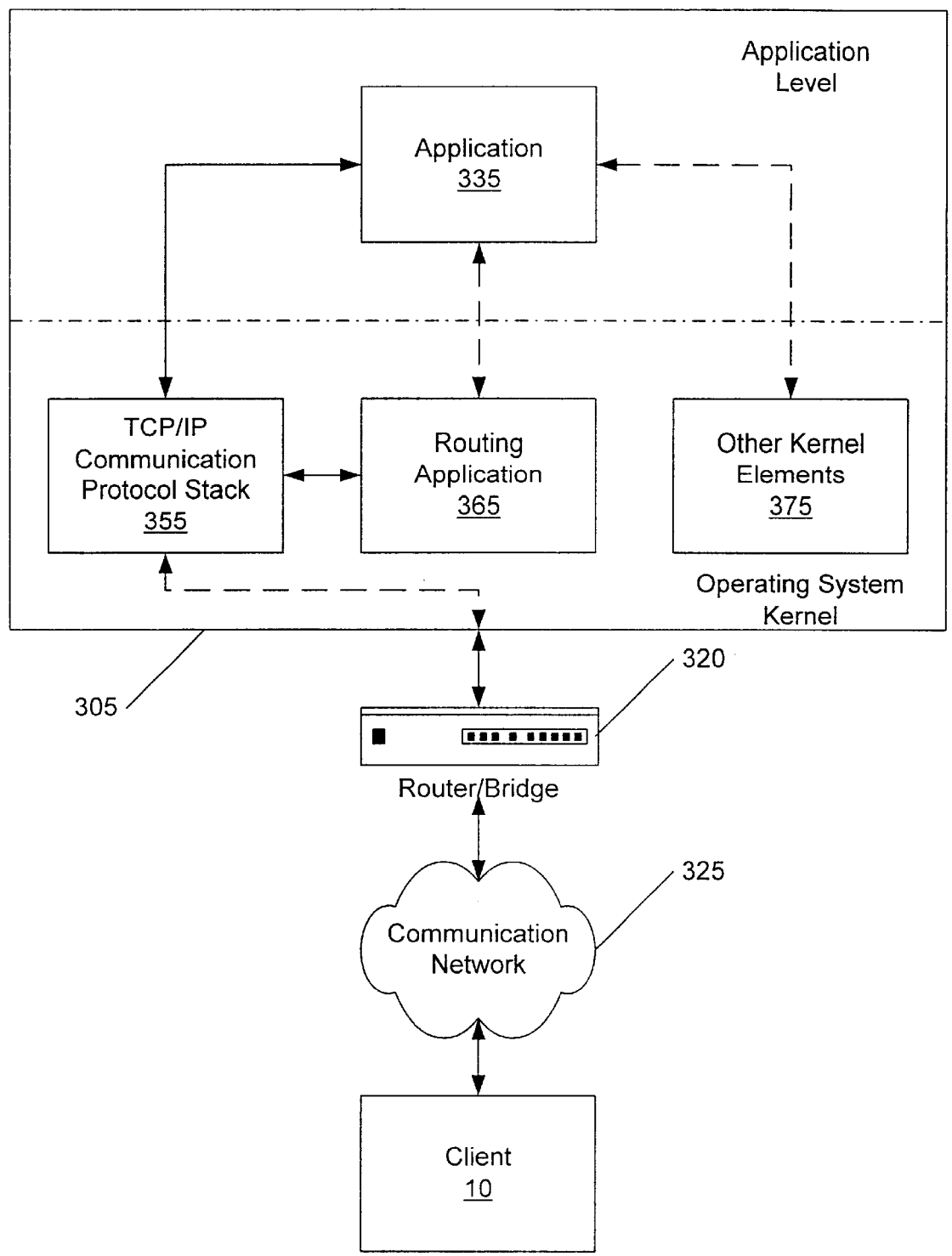
FIG. 3 is block diagram illustrating a data processing system incorporating embodiments of the present invention.

FIG. 3 is a block diagram of a data processing system that illustrates systems, methods, and computer program products in accordance with embodiments of the present invention. As shown in the embodiments of FIG. 3, the server 305 includes application level processes, which may support a transaction from a client over a connection, and processes executing in the operating system kernel. As shown in FIG. 3, an exemplary application 335 supporting communications over the communication network 325 is illustrated. For the illustration of FIG. 3, the communicating application 335 is shown as communicating with the communication network 325 using a TCP/IP communication protocol stack 355 included in the operating system kernel of the server 305. In addition, a kernel based routing application 365, which may be an application plug-in process within the operating system kernel and accessible from the operating system kernel, for example, by application-specific exit associated with the application 335 (or more exits where more applications are found on the server 302). It is to be understood that other kernel elements 375 are typically also found on the server 305, which other kernel elements 375 may further support communications with applications over the communication network 325 using other layered protocols.

The TCP/IP communication protocol stack 355, as shown in FIG. 3, communicates with the communication network 325 through a router/bridge device 320. Where the router/bridge device 320 is a router, it typically routes communications packets based on level 4 information, such as destination IP address. Where the router/bridge device 320 is a bridge, it may process communications within a network node using level 3 information, such as machine identification number, rather than level 4 IP address information.

As shown in FIG. 3, the TCP/IP communication protocol stack kernel 355 processes communications between the application 335 of the server 305 and the communication network 325. Such communications are typically initiated responsive to an incoming communication directed to the application 335 which communication initiates subsequent outgoing communications from the server 305 based on content provided by the application 335 responsive to the incoming communication request.

As will be appreciated by those of skill in the art, the operating system in which the present invention is incorporated may be any operating system suitable for use with a data processing system, such as OS/2, AIX or OS/390 from International Business Machines Corporation, Armonk, N.Y., Solaris from Sun Microsystems, WindowsCE, WindowsNT, Windows95, Windows98, Windows ME or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

The present invention is described generally with reference to FIGS. 1 to 3 and will be understood by those of skill in the art as beneficial for servers, particularly more complex servers that are often capable of handling different types of client transactions. Each of these transactions may be serviced by different applications supported by a server. For instance, a single HTTP server may support many different back-end applications such as one for managing a shopping cart, one for browsing inventory, one for handling purchasing requests, one for inventory and so on.

For performance reasons, such a server may process multiple transactions over a single TCP/IP connection rather than open new connections for each transaction. Again, using HTTP as an example, browser clients generally send multiple requests over a single TCP/IP connection rather than close the active connection and open a new one.

Furthermore, for performance reasons, it is known to use a pool or cluster of servers to process client requests. When a client connects to a server in such an environment, one of the servers from this pool or cluster is selected. A load balancer, such as a routing node, may be used in selecting the "optimal" server from the cluster where "optimal" typically means the server which is best capable of handling the new client connection.

However, it is generally not possible to know the type of transaction the client will request before a connection is established and, as a client may initiate multiple transactions over the connection once established, each server in such cases must be able to support the complete set of transactions which a client may request. If the server in such an environment is not capable of not supporting any single transaction, it is generally removed from the pool of servers to which a client may connect. From a functional perspective, only the subset of servers in the pool supporting the range of transactions would be viewed as homogenous servers in such an environment.

Furthermore, such environments typically provide load balancing which is performed when a new connection request is received. However, this approach may be limited in that it assumes each server is capable of processing each transaction with equal efficiency which is often not the case. For example, one server may be best for browsing inventory while a different server may be better for managing a shopping cart and so on. From a customer perspective, this may result in a set of servers which must support all the same set of back-end applications and load balancing on a node-wide basis.

By implementing the present invention as described above in such a cluster of data processing systems environment, the deployment of a heterogeneous set of servers in the cluster may be facilitated. Each server in the cluster may support only a subset of the actual applications. When a client initiates a transaction, the client may be transparently (from the client's perspective) routed to a server capable of processing the transaction. The server which is best able to process the transaction may be selected from those servers within the cluster which support the transaction. The process may be repeated for each transaction initiated by the client. As each new transaction is received on the active connection, the server best able to process a new transaction may be selected and the active connection may then be again transferred to that server for processing. This transfer and subsequent processing of the transaction may be done in a manner transparent to the client.

Figure 4:
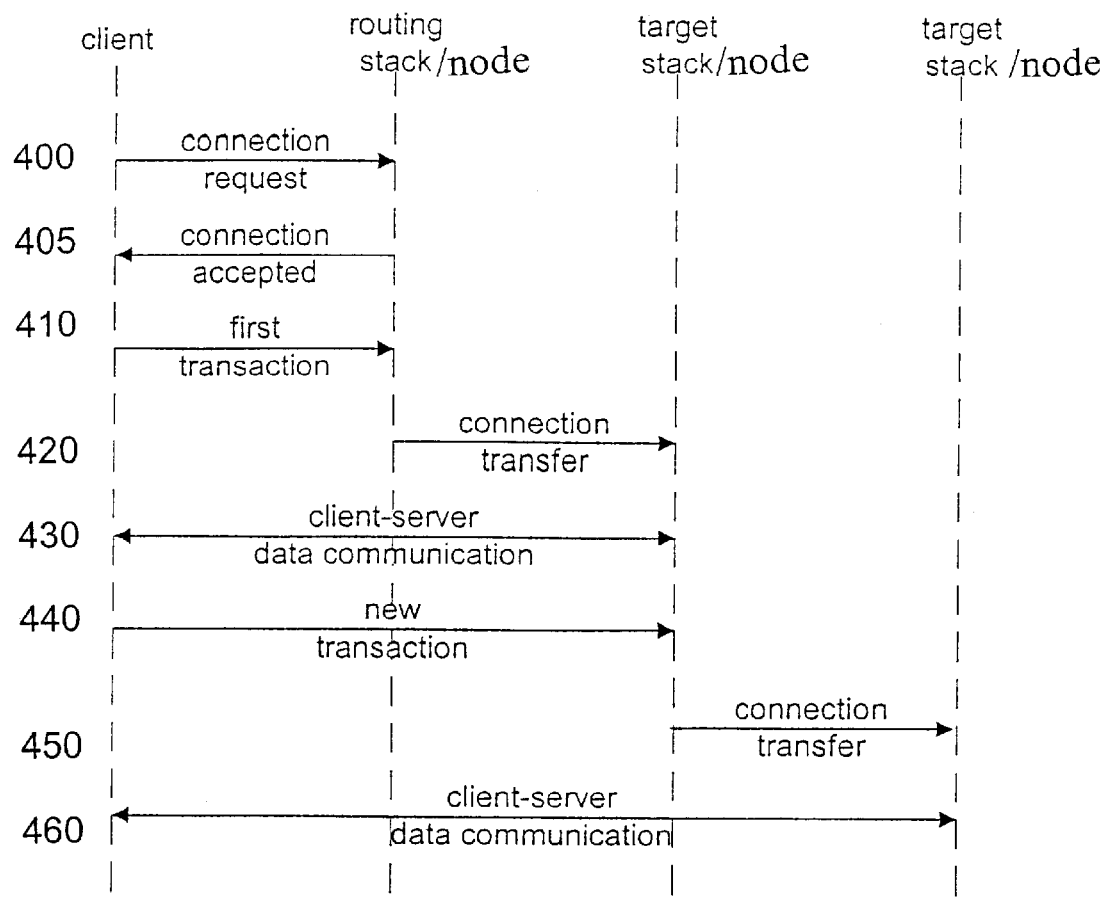
FIG. 4 is a schematic illustration of kernel-based load balancing and multi-node active connection transfer operations according to embodiments of the present invention.

This initial set up and subsequent further transfer of a connection is further illustrated in FIG. 4. As shown in item 400 of FIG. 4 a new connection request is received at a routing stack/node. The routing stack/node accepts the new connection (405). At this point, however, no routing decision needs to have been made. The client then sends an initial transaction to the routing stack/node (410). The routing stack/node in cooperation with a routing application executing in the operating system kernel, as described above, examines application level information from the transaction to determine a target server to process the request. The routing node then initiates a transfer of the connection to the selected target server (420). The client and server then continue with processing of the transaction using the connection (430). The sequence to this point will generally be further described below as kernel-based policy driven load balancing.

As shown in FIG. 4, a new transaction request is then received at a communication protocol target stack of the target host node using the active connection (440). The transaction request is examined by the target stack/node, such as described previously with reference to item 420 above, and it is determined, for the example of FIG. 4, that a different server is best capable of processing the request. The current target stack/node then initiates a transfer of the connection to the new target host (450). Note, however, that it is also possible that the current target stack/node will determine that it is also the optimal host for the next transaction and that no transfer will be required as the connection will continue to be associated with an appropriate application executing at the current target stack/node. For the examples shown in FIG. 4, the client and the target stack/node complete processing of the transaction using communications over the active connection (460). Note that the operations illustrated at items 440–460 may be repeated until the active connection is terminated. Such operations, as shown at items 440–460, will generally be further described below as multi-node active connection transfer.

Kernel-Based Policy Driven Load Balancing may allow a load balancing node to consider application-specific data in making its load balancing decision as shown by items 400–430 of FIG. 4. In order to accomplish this, the server preferably a) understands the transaction being processed, and (b) waits until enough of a transaction is received to identify the transaction and to make the load balancing decision. Once the proper target host is selected, the connection may be moved from the current server to the target host. This may include moving the TCP/IP state, IP state, and any security state (such as IPSec or TLS state).

When a connection request is received by the load balancing node, the load balancing node may accept the connection and begin to exchange data with the client. As data is received, the load balancing node, in various embodiments of the present invention, drives application-specific exits within the operating system kernel, such as those provided by Fast Response Cache Accelerator (FRCA), to examine the connection data. Once sufficient data has been received to identify the transaction, the exit notifies the kernel of the type of transaction. For example, for web traffic, the Universal Resource Identifier (URI) can be used to classify the type of transaction. By using kernel-based exits, the classification mechanism may be extended to new application workload, generally without requiring updates to the applications themselves.

Once the transaction has been classified, a policy-based engine within the kernel may be used to select the appropriate server to process the transaction. The decision on which server to process the transaction can be based on many criteria. At the simplest level, it may simply select any server capable of processing the particular transaction type. Other metrics (average response time, active workload on the server, network bandwidth considerations, etc.) may also be applied in the selection of the appropriate server.

Once the appropriate target application is selected, the connection is moved to the target host for processing. After the connection is moved to the target host, the receiving socket may be made available to the target application. Subsequent transactions may continue to be processed on the stack which supports the application which initially opens the connection.

This kernel-based load balancing approach may require no change to the application itself. It may be suited to cases where, for example, there are single transactions per connection or all transactions received over a connection are of same type.

Multi-Node Active Connection Transfers (ACT), in accordance with various embodiments of the present invention, may further allow an active TCP/IP connection to be moved from one server to another server. Once moved, the connection may be closed on the current server and made available to the application on the new server.

The connection is preferably only moved if the application on the initial server indicates it is acceptable to do so. This may be signaled, for example, by the application setting fields in the ancillary data of the sendmsg socket call as a notification that a transaction is completed. In the ancillary data, the application, may optionally, also pass the application context or state information, if any, which should be made available to the new target host. However, such application state information may be a null set (i.e., not required). If the connection is transferred to a new host, then the socket on the server may be closed.

In order to move the active connection, some, and in some cases, all, of the following state information may be transferred.

1. The TCP/IP stack's state should be moved to the new server. Information such as the TCP state (sent/received sequence numbers, MSS, window scaling parameters), IP state (source/destination IP address, port numbers), IPSec state, and TLS state should be moved and reinitialized at the new server. This is the same state information which may be moved for the Kernel-Based Policy Driven Load Balancing item mentioned above.

2. The application's state may also be moved to the new server. In some cases, the application state may not need to transfer any state information; in other cases, application state data may be needed.

3. Any queued data at the "old" server is preferably transferred to the "new" server. While TCP/IP can retransmit any data lost, there may be performance penalties if the data is dropped and retransmitted.

4. The application on the "new" server should be able to recognize the new connection as an existing connection and find the associated application state. This may be accomplished, for example, by examining the ancillary data on the recvmsg socket call. For a connection which is transferred, the application context passed by the "old" server on the sendmsg call may be made available to the "new" server on the recvmsg call. Likewise, the application on the "old" server should be able to relinquish ownership of the existing connection. This may be accomplished by closing the socket on the "old" server.

The transfer of the active connection as described herein may be transparent to the client. However, it may require changes to the applications, both on the initial host and, if context is to be transferred, on the new host. On the initial host, the application may also be modified to signal when a particular transaction has been completed and it is possible to move the connection to a new host. The initial host may also provide any application context which should be transferred with the active connection. In many cases, there will be no application context which needs to be moved.

On the new host, no changes to the application may be required, particularly, if no application context (state) needs to be transferred or if the application has other methods for sharing the context. For instance, the web server on z/OS shares context between all instances of the web server in a sysplex via DB2 data sharing and, as such, typically has no context which needs to be transferred. If there is application context which does need to be transferred, the application on the host should be prepared to receive and initialize the context when it accepts the new connection. This context may be provided to the application as ancillary data on the first recvmsg socket call made after the connection is accepted.

In a further aspect of the present invention, Transaction Load Balancing (TLB) may piece together Kernel-Based Policy Driven Load Balancing and Active Connection Transfer. Each application may process a single transaction at the server. Once the transaction is completed, the application may indicate that the connection may be routed to a new server for processing subsequent transactions. This may be signaled, for example, by setting the appropriate fields in the ancillary data of the last sendmsg socket call invoked by the application.

The TCP/IP stack may examine the next transaction sent by the client and determine the optimal server for the transaction, using the metrics described in the Kernel-Based Policy Driven Load Balancing description above. If it is the current server that is optimal, the connection may be made available to the application which is waiting on the recvmsg socket call. If a different server is optimal, the connection may be transferred to the proper host as described in the Active Connection Transfer description above. The connection is transferred, the socket on the current server is closed, and the connection is made available to the application on the new server.

After the application transfers socket ownership to the stack, the next transaction received may be examined and classified. The "best" server to process the transaction may be identified, the connection transferred, and this "best" server may then process the transaction. Once the transaction is completed, the application may transfer ownership of the socket to the TCP/IP stack and the process repeats. This may continue until the socket is closed.

To avoid thrashing, the metrics for transferring the active connection may include a "threshold" which specifies how much "better" the new server must be than the current server before the connection is transferred. In its degenerative form, the metric could have a threshold value of "0," implying the connection should be moved if the new server is considered preferable than the current server by any amount.

Figure 5:
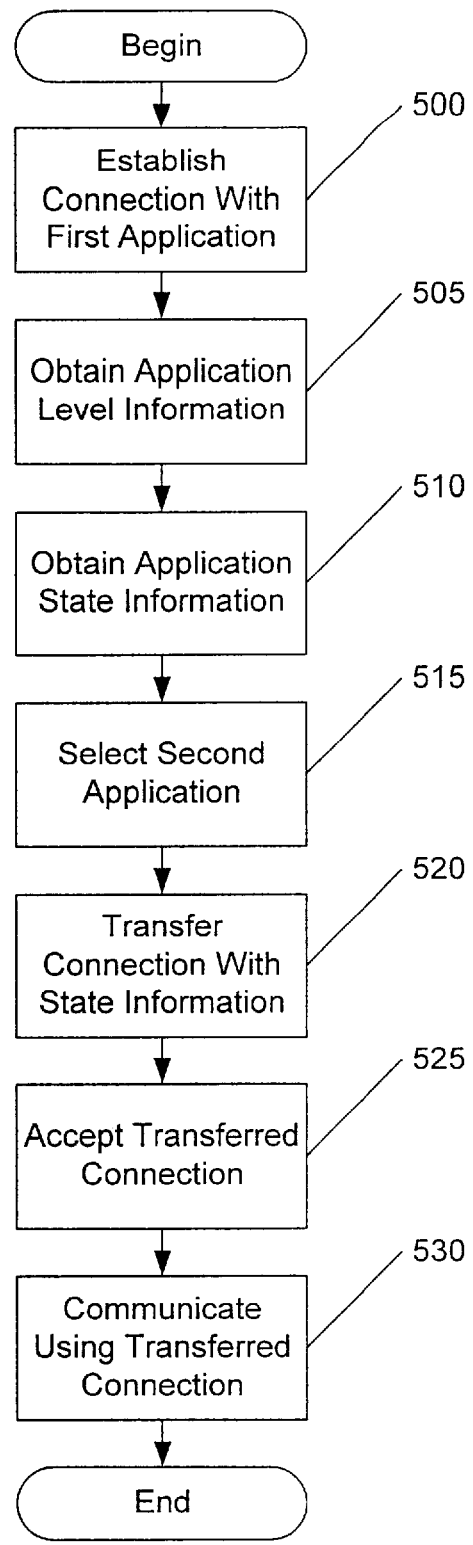
FIG. 5 is a flowchart illustrating operations for transfer of a TCP connection according to further embodiments of the present invention.

Referring now to the flowchart diagram of FIG. 5, operations related to transferring a transmission control protocol (TCP) connection with the client device between data processing systems in a cluster of data processing systems, such as for use with multi-node active connection transfer as generally described above, will be further described. Operations begin at block 500 with a connection established between the client device and a first application at a first data processing system of the cluster of data processing systems utilizing a first communication protocol stack associated with the first application. The first communication protocol stack has an associated connection state.

An operating system kernel of the first data processing system carries out the steps illustrated at blocks 505–520. More particularly, application level information, such as level 5 or above information for a TCP/IP connection, is obtained from a first transaction received from the client over the connection (block 505). The transaction may include one or more requests. In addition, application state information associated with the connection is obtained from the first application (block 510). A second application is selected at a second data processing system of the cluster of data processing systems for transfer of the connection based on the obtained information (block 515).

Selection of the target application may be carried out by a policy-based engine of the operating system kernel of the first data processing system. Alternatively, operations at block 515 related to selecting the second application may be provided by making the connection available to a routing device other than the first data processing system, such as a routing node of the cluster of data processing systems, for selection of the second application. Making the connection available to such a routing device may, in various embodiments, be initiated responsive to receipt of a notification of completion of the transaction from the first application.

In any event, the connection is transferred to a second communication protocol stack on the second data processing system associated with the selected second application, either directly from the first data processing system or through a separate routing device such as a routing node (block 520). The transfer includes providing to the second data processing system both the associated state information for the first communication protocol stack and the obtained application state information associated with the connection from the first application.

The connection in various embodiments of the present invention is then accepted by the second communication protocol stack from the first data processing system based on the provided associated state information of the first communication protocol stack and the obtained application state information (block 525). The transfer may then be provided transparently to the client so as to establish communications between the client and the second application. More particularly, in various embodiment, the second communication protocol stack may provide the obtained application state information to the second application so as to re-establish the connection transparently to the client as well as utilizing the connection state information from the first communication protocol stack. Thus, a state of the connection at the second data processing system may be set to a state specified by the provided associated state information of the first communication protocol stack and the obtained application state information to provide a transferred connection to the second application. The second application may then communicate with the client utilizing the transferred connection (block 530).

Embodiments of the present invention have been described with reference to FIGS. 1 through 5 which are block diagrams and/or flowchart illustrations. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagram block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and/or block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

The present invention has been described with reference to particular sequences of operations. However, as will be appreciated by those of skill in the art, other sequences may be utilized while still benefitting from the teachings of the present invention. Thus, while the present invention is described with respect to a particular division of functions in the kernel or sequences of events, such divisions or sequences are merely illustrative of particular embodiments of the present invention and the present invention should not be construed as limited to such embodiments.

Furthermore, while the present invention has been described with reference to particular embodiments of the present invention, as will be appreciated by those of skill in the art, the present invention may be embodied in other environments and should not be construed as limited to such environments but may be incorporated into other systems where applications or groups of applications are associated with an address rather than a communications adapter. Thus, the present invention may be suitable for use in any collection of data processing systems which allow sufficient communication to all of the systems for the use of dynamic virtual addressing or the like.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of transferring a Transmission Control Protocol (TCP) connection with a client device between data processing systems in a cluster of data processing systems, the method comprising:

establishing a connection between the client device and a routing node coupled to the cluster of data processing systems utilizing a communication protocol stack at the routing node, the protocol stack having associated state information;

wherein an operating system kernel of the routing node carries out the following:

obtaining application level information from an initial transaction received from the client over the connection, the transaction including at least one request;

selecting a target application at a first data processing system of the cluster of data processing systems for transfer of the connection based on the obtained information; and transferring the connection to a target communication protocol stack on the first data processing system associated with the selected target application including providing the associated state information of the communication protocol stack of the routing node; and wherein the target communication protocol stack carries out the following:

accepting the connection from the routing node based on the provided associated state information of the communication protocol stack of the routing node so as to, transparently to the client, establish communications between the client and the target application;

receiving a notification of completion of the transaction from the target application; and making the connection available to a routing device for selection of a next target application to receive the connection responsive to receipt of the notification of completion of the transaction.

2. The method of claim 1 wherein the routing device comprises either the routing node or the first data processing system.

3. The method of claim 1 wherein the step of receiving a notification of completion of the transaction from the target application comprises receiving the notification from the target application at the target communication protocol stack over the connection as data which is detectable by the target communication protocol stack as being directed to the target communication protocol stack rather than the client.

4. The method of claim 3 wherein the step of receiving the notification from the target application at the target communication protocol stack comprises receiving the data as ancillary data of a sendmsg socket call.

5. The method of claim 4 wherein the data further comprises application state information associated with the connection from the target application and wherein the method further comprises providing the application state information to the routing device for use in transferring the connection to the next target application and wherein a communication protocol stack associated with the next target application receives the application state information and the notification as ancillary data of a recvmsg socket call.

6. The method of claim 5 further comprising providing associated state information of the target communication protocol stack to the routing device for use in transferring the connection to the next target application.

7. The method of claim 6 wherein the application state information is a null set.

8. The method of claim 6 further comprising the following carried out by an operating system kernel of the routing device:

obtaining application level information from a next transaction received from the client over the connection, the next transaction including at least one request;

selecting the next target application at a data processing system of the cluster of data processing systems for transfer of the connection based on the obtained application level information from a next transaction; and transferring the connection to the communication protocol stack associated with the next target application including providing the associated state information of the target communication protocol stack and the application state information associated with the connection to the communication protocol stack associated with the next target application.

9. The method of claim 8 wherein the step of selecting a target application is carried out by a policy-based engine of the operating system kernel of the routing node.

10. The method of claim 1 further comprising the following carried out by an operating system kernel of the routing device:

obtaining application level information from a next transaction received from the client over the connection, the next transaction including at least one request;

selecting the next target application at a data processing system of the cluster of data processing systems for transfer of the connection based on the obtained application level information from the next transaction; and transferring the connection to a communication protocol stack associated with the next target application including providing associated communication protocol stack state information for the routing device to the communication protocol stack associated with the next target application.

11. The method of claim 10 wherein the routing device comprises either the routing node or the first data processing system.

12. The method of claim 1 wherein the step of selecting a target application is carried out by a policy-based engine of the operating system kernel of the routing node.

13. The method of claim 1 wherein obtaining application level information further comprises obtaining sufficient application level information to identify the initial transaction.

14. The method of claim 1 wherein obtaining application level information further comprises executing application-specific exits within the operating kernel of the routing node to examine data associated with the transaction to identify the transaction to the operating kernel of the routing node.

15. The method of claim 1 further comprising making the communication protocol stack of routing node available after the connection is transferred.

16. The method of claim 1 wherein the connection is an encrypted connection and wherein the provided associated state information includes encryption information.

17. A method of transferring a Transmission Control Protocol (TCP) connection with a client device between data processing systems in a cluster of data processing systems, the method comprising:
   establishing a connection between the client device and a first application at a first data processing system of the cluster of data processing systems utilizing a first communication protocol stack associated with the first application, the first communication protocol stack having associated state information;
   wherein an operating system kernel of the first data processing system carries out the following:
      obtaining application level information from a transaction received from the client over the connection, the transaction including at least one request;
      obtaining application state information associated with the connection from the first application;
      selecting a second application at a second data processing system of the cluster of data processing systems for transfer of the connection based on the obtained application level information; and
      transferring the connection to a second communication protocol stack on the second data processing system associated with the selected second application including providing to the second data processing system the associated state information of the first communication protocol stack and the obtained application state information associated with the connection from the first application.

18. The method of claim 17 wherein the second communication protocol stack carries out the following:
   accepting the connection from the first data processing system based on the provided associated state information of the first communication protocol stack and the obtained application state information so as to, transparently to the client, establish communications between the client and the second application.

19. The method of claim 18 wherein the step of accepting the connection further comprises providing the obtained application state information to the second application.

20. The method of claim 19 wherein the step of providing the obtained application state information further comprises providing the obtained application state information to the second application as ancillary data of a recvmsg socket call.

21. The method of claim 20 wherein the step of obtaining application state information associated with the connection from the first application further comprises receiving the application state information from the first application as ancillary data of a sendmsg socket call.

22. The method of claim 19 wherein the step of obtaining application level information from an initial transaction received from the client over the connection further comprises executing application-specific exits within the operating kernel of the first data processing system to examine data associated with the transaction to identify the transaction to the operating kernel of the first data processing system.

23. The method of claim 19 further comprising the following performed by the operating system kernel of the first data processing system:
   receiving a notification of completion of the transaction from the first application; and
   wherein the step of selecting a second application further comprises making the connection available to a routing device for selection of the second application responsive to receipt of the notification of completion of the transaction.

24. The method of claim 23 wherein the routing devices comprises either the first data processing system or a routing node shared by ones of the cluster of data processing systems.

25. The method of claim 19 wherein the step of accepting the connection from the first data processing system further comprises setting a state of the connection at the second data processing system to a state specified by the provided associated state information of the first communication protocol stack and the obtained application state information to provide a transferred connection to the second application; and
   wherein the second application carries out communicating with the client utilizing the transferred connection.

26. A system for transferring a Transmission Control Protocol (TCP) connection with a client device between data processing systems in a cluster of data processing systems, the system comprising:
   means for establishing a connection between the client device and a routing node coupled to the cluster of data processing systems utilizing a communication protocol stack at the routing node, the protocol stack having associated state information;
   an operating system kernel of the routing node, the operating system kernel of the routing node comprising:
      means for obtaining application level information from an initial transaction received from the client over the connection, the transaction including at least one request;
      means for selecting a target application at a first data processing system of the cluster of data processing systems for transfer of the connection based on the obtained information; and
      means for transferring the connection to a target communication protocol stack on the first data processing system associated with the selected target application including providing the associated state information of the communication protocol stack of the routing node;
   wherein the target communication protocol stack comprises:
      means for accepting the connection from the routing node based on the provided associated state information of the communication protocol stack of the routing node so as to, transparently to the client, establish communications between the client and the target application;
      means for receiving a notification of completion of the transaction from the target application; and
      means for making the connection available to a routing device for selection of a next target application to receive the connection responsive to receipt of the notification of completion of the transaction.

27. The system of claim 26 wherein the routing device comprises either the routing node or the first data processing system.

28. The system of claim 26 wherein the means for receiving a notification of completion of the transaction from the target application comprises means for receiving the notification from the target application at the target communication protocol stack over the connection as data which is detectable by the target communication protocol stack as being directed to the target communication protocol stack rather than the client.

29. The system of claim 28 wherein the means for receiving the notification from the target application at the target communication protocol stack comprises means for receiving the data as ancillary data of a sendmsg socket call.

30. The system of claim 29 wherein the data further comprises application state information associated with the connection from the target application and wherein the system further comprises means for providing the application state information to the routing device for use in transferring the connection to the next target application; and a communication protocol stack associated with the next target application that receives the application state information and the notification as ancillary data of a recvmsg socket call.

31. The system of claim 30 wherein the means for selecting a target application comprises a policy-based engine of the operating system kernel of the routing node.

32. The system of claim 26 wherein the means for obtaining application level information further comprises executable application-specific exits within the operating kernel of the routing node configured to examine data associated with the transaction to identify the transaction to the operating kernel of the routing node.

33. The system of claim 26 wherein the connection is an encrypted connection and wherein the provided associated state information includes encryption information.

34. A system for transferring a Transmission Control Protocol (TCP) connection with a client device between data processing systems in a cluster of data processing systems, the system comprising:

means for establishing a connection between the client device and a first application at a first data processing system of the cluster of data processing systems utilizing a first communication protocol stack associated with the first application, the first communication protocol stack having associated state information;

an operating system kernel of the first data processing system, the operating system kernel of the first data processing system further comprising:

means for obtaining application level information from a transaction received from the client over the connection, the transaction including at least one request;

means for obtaining application state information associated with the connection from the first application;

means for selecting a second application at a second data processing system of the cluster of data processing systems for transfer of the connection based on the obtained application level information; and means for transferring the connection to a second communication protocol stack on the second data processing system associated with the selected second application including providing to the second data processing system the associated state information of the first communication protocol stack and the obtained application state information associated with the connection from the first application.

35. The system of claim 34 wherein the second communication protocol stack further comprises:

means for accepting the connection from the first data processing system based on the provided associated state information of the first communication protocol stack and the obtained application state information so as to, transparently to the client, establish communications between the client and the second application.

36. The system of claim 35 wherein the means for accepting the connection further comprises means for providing the obtained application state information to the second application.

37. The system of claim 36 wherein the means for providing the obtained application state information further comprises means for providing the obtained application state information to the second application as ancillary data of a recvmsg socket call.

38. The system of claim 37 wherein the means for obtaining application state information associated with the connection from the first application further comprises means for receiving the application state information from the first application as ancillary data of a sendmsg socket call.

39. The system of claim 36 wherein the means for obtaining application level information from an initial transaction received from the client over the connection further comprises executable application-specific exits within the operating kernel of the first data processing system that examine data associated with the transaction to identify the transaction to the operating kernel of the first data processing system.

40. The system of claim 36 wherein the operating system kernel of the first data processing system further comprises:

means for receiving a notification of completion of the transaction from the first application; and wherein means for selecting a second application further comprises means for making the connection available to a routing device for selection of the second application responsive to receipt of the notification of completion of the transaction.

41. The system of claim 40 wherein the routing device comprises either the first data processing system or a routing node shared by ones of the cluster of data processing systems.

42. The system of claim 36 wherein the means for accepting the connection from the first data processing system further comprises means for setting a state of the connection at the second data processing system to a state specified by the provided associated state information of the first communication protocol stack and the obtained application state information to provide a transferred connection to the second application; and wherein the second application comprise means for communicating with the client utilizing the transferred connection.

43. A computer program product for transferring a Transmission Control Protocol (TCP) connection with a client device between data processing systems in a cluster of data processing systems, comprising:

a computer-readable storage medium having computer-readable program code embodied in said medium, said computer-readable program code comprising:

computer-readable program code which establishes a connection between the client device and a routing node coupled to the cluster of data processing systems utilizing a communication protocol stack at the routing node, the protocol stack having associated state information;

computer-readable program code for execution in an operating system kernel of the routing node which obtains application level information from an initial transaction received from the client over the connection, the transaction including at least one request;

computer-readable program code for execution in an operating system kernel of the routing node which selects a target application at a first data processing system of the cluster of data processing systems for transfer of the connection based on the obtained information;

computer-readable program code for execution in an operating system kernel of the routing node which transfers the connection to a target communication protocol stack on the first data processing system associated with the selected target application including providing the associated state information of the communication protocol stack of the routing node;

computer-readable program code which accepts the connection from the routing node based on the provided associated state information of the communication protocol stack of the routing node so as to, transparently to the client, establish communications between the client and the target application;

computer-readable program code which receives a notification of completion of the transaction from the target application; and computer-readable program code which makes the connection available to a routing device for selection of a next target application to receive the connection responsive to receipt of the notification of completion of the transaction.

44. The computer program product of claim 43 wherein the computer-readable program code which receives a notification of completion of the transaction from the target application comprises computer-readable program code which receives the notification from the target application at the target communication protocol stack over the connection as data which is detectable by the target communication protocol stack as being directed to the target communication protocol stack rather than the client.

45. The computer program product of claim 44 wherein the computer-readable program code which receives the notification from the target application at the target communication protocol stack comprises computer-readable program code which receives the data as ancillary data of a sendmsg socket call.

46. The computer program product of claim 45 wherein the data further comprises application state information associated with the connection from the target application and wherein the computer program product further comprises:

computer-readable program code which provides the application state information to the routing device for use in transferring the connection to the next target application; and computer-readable program code which receives the application state information and the notification as ancillary data of a recvmsg socket call.

47. The computer program product of claim 43 wherein the computer-readable program code which obtains application level information further comprises application-specific exit computer-readable program code for execution within the operating kernel of the routing node which examines data associated with the transaction to identify the transaction to the operating kernel of the routing node.

48. The computer program product of claim 43 wherein the connection is an encrypted connection and wherein the provided associated state information includes encryption information.

49. A computer program product for transferring a Transmission Control Protocol (TCP) connection with a client device between data processing systems in a cluster of data processing systems, comprising:

a computer-readable storage medium having computer-readable program code embodied in said medium, said computer-readable program code comprising:

computer-readable program code which establishes a connection between the client device and a first application at a first data processing system of the cluster of data processing systems utilizing a first communication protocol stack associated with the first application, the first communication protocol stack having associated state information;

computer-readable program code for execution in an operating system kernel of the routing node which obtains application level information from a transaction received from the client over the connection, the transaction including at least one request;

computer-readable program code for execution in an operating system kernel of the routing node which obtains application state information associated with the connection from the first application;

computer-readable program code for execution in an operating system kernel of the routing node which selects a second application at a second data processing system of the cluster of data processing systems for transfer of the connection based on the obtained application level information; and computer-readable program code for execution in an operating system kernel of the routing node which transfers the connection to a second communication protocol stack on the second data processing system associated with the selected second application including providing to the second data processing system the associated state information of the first communication protocol stack and the obtained application state information associated with the connection from the first application.

50. The computer program product of claim 49 wherein further comprising:

computer-readable program code which accepts the connection from the first data processing system based on the provided associated state information of the first communication protocol stack and the obtained application state information so as to, transparently to the client, establish communications between the client and the second application.

51. The computer program product of claim 50 wherein the computer-readable program code which accepts the connection further comprises computer-readable program code which provides the obtained application state information to the second application.

52. The computer program product of claim 51 wherein the computer-readable program code which provides the obtained application state information further comprises computer-readable program code which provides the obtained application state information to the second application as ancillary data of a recvmsg socket call.

53. The computer program product of claim 52 wherein the computer-readable program code which obtains application state information associated with the connection from the first application further comprises computer-readable program code which receives the application state information from the first application as ancillary data of a sendmsg socket call.

54. The computer program product of claim 51 wherein the computer-readable program code which obtains application level information from an initial transaction received from the client over the connection further comprises application-specific exit computer-readable program code within the operating kernel of the first data processing system which examines data associated with the transaction to identify the transaction to the operating kernel of the first data processing system.

* * * * *